US009083013B2

United States Patent
Itoh et al.

(10) Patent No.: US 9,083,013 B2
(45) Date of Patent: Jul. 14, 2015

(54) ELECTROCHEMICAL DEVICE

(75) Inventors: Hidetake Itoh, Tokyo (JP); Kazuo Katai, Tokyo (JP); Yoshihiko Ohashi, Tokyo (JP); Yosuke Miyaki, Tokyo (JP); Akio Yamanaka, Tokyo (JP); Hiroaki Hasegawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 745 days.

(21) Appl. No.: 13/188,923

(22) Filed: Jul. 22, 2011

(65) Prior Publication Data

US 2012/0028109 A1    Feb. 2, 2012

(30) Foreign Application Priority Data

Jul. 28, 2010   (JP) ................. P2010-169611

(51) Int. Cl.
*H01M 2/00* (2006.01)
*H01M 2/02* (2006.01)
*H01M 2/06* (2006.01)
*H01M 10/0525* (2010.01)

(52) U.S. Cl.
CPC .......... *H01M 2/0275* (2013.01); *H01M 2/0262* (2013.01); *H01M 2/0267* (2013.01); *H01M 2/0287* (2013.01); *H01M 2/0207* (2013.01); *H01M 2/06* (2013.01); *H01M 10/0525* (2013.01)

(58) Field of Classification Search
CPC . H01M 2/0207; H01M 2/021; H01M 2/0212; H01M 2/0215; H01M 2/06; H01M 2/0275
USPC .................. 429/163, 176, 177, 179, 180, 185
See application file for complete search history.

(56) References Cited

U.S. PATENT DOCUMENTS

| 6,368,744 | B1 | 4/2002 | Hatazawa et al. |
| 7,054,139 | B2 | 5/2006 | James et al. |
| 7,233,482 | B2 | 6/2007 | James et al. |
| 7,554,790 | B2 | 6/2009 | James et al. |
| 2008/0233468 | A1 | 9/2008 | Otohata et al. |
| 2010/0255257 | A1 | 10/2010 | Asai |

FOREIGN PATENT DOCUMENTS

| CN | 1812157 A | 8/2006 |
| JP | 2000-138040 | 5/2000 |
| JP | 2000-156208 | 6/2000 |
| JP | 2002-025514 | 1/2002 |
| JP | 2002-075320 | 3/2002 |
| JP | 2003-036824 | 2/2003 |
| JP | 2004-515083 | 5/2004 |
| JP | 2004-265762 | 9/2004 |

(Continued)

*Primary Examiner* — Milton I Cano
*Assistant Examiner* — Jimmy K Vo
(74) *Attorney, Agent, or Firm* — Oliff PLC (57) ABSTRACT

In an electrochemical device having an element main body 1A enclosed in an exterior package 1B, a peripheral region of the exterior package 1B is provided with an elastic structure or a plurality of elastic structures R1, R2 having an elastic force in a thickness direction (Z-axis direction) of films. Each of the elastic structures R1, R2 has a first region of the exterior package 1B folded along a film outer edge, and a second region of the exterior package 1B opposed to the first region. Two ends R11, R13 (R21, R23) of the first region in a direction along the film outer edge are in contact with the second region, and between the two ends R11, R13 (R21, R23) there is a space (with a maximum height 2R) between the first region and the second region.

9 Claims, 11 Drawing Sheets

(56) References Cited

FOREIGN PATENT DOCUMENTS

| | | |
|---|---|---|
| JP | 2005-116278 | 4/2005 |
| JP | 2006-054099 | 2/2006 |
| JP | 2006-114513 | 4/2006 |
| JP | 2006-156161 | 6/2006 |
| JP | 2006-179442 | 7/2006 |
| JP | 2007-311163 | 11/2007 |
| JP | 2009-130073 | 6/2009 |
| JP | 2009-224147 | 10/2009 |
| WO | WO 2005/036674 A1 | 4/2005 |

| | Experimental Condition (A)<br>Each of samples was dropped from height of 30cm while its side surface down. These dropping tests were repeated 100 times. | Experimental Condition (B)<br>Each of samples was dropped from height of 30cm while its corner down. These dropping tests were repeated 100 times. |
|---|---|---|
| Comparative Example 1 | (1) Deformation was not occurred.<br>(2) Electrical characteristic was not changed. | (1-1) Deformation was occurred at the sealing portion.<br>(1-2) Deformation was not occurred at the main body.<br>(2) Electrical characteristic was not changed. |
| Comparative Example 2 | (1) Deformation was not occurred.<br>(2) Electrical characteristic was not changed. | (1-1) Deformation was occurred at the sealing portion.<br>(1-2) Deformation was not occurred at the main body.<br>(2) Electrical characteristic was not changed. |
| Example | (1) Deformation was not occurred.<br>(2) Electrical characteristic was not changed. | (1) Deformation was not occurred.<br>(2) Electrical characteristic was not changed. |
| Comparative Example 3 | (1) Deformation was occurred.<br>(2) Electrical characteristic was changed. That is, the leakage current was increased 1.2 times. | (1) Deformation was occurred.<br>(2) Electrical characteristic was changed. That is, the leakage current was increased 1.2 times. |

ELECTROCHEMICAL DEVICE

BACKGROUND OF THE INVENTION

1. Field of the Invention

An aspect of the present invention relates to an electrochemical device.

2. Related Background Art

There are conventionally known electrochemical devices such as a laminate type lithium ion battery (LIB) and an electric double layer capacitor (EDLC). An electrochemical element has an element main body consisting of a battery element having a multilayer structure, a laminate sheet (film-like package) to enclose the element main body inside, and tab type terminals (electrodes) drawn out from the element main body to the outside of the laminate sheet, for enabling electrical connection of the element main body to external equipment. The electrochemical devices of this kind are described, for example, in Patent Literatures 1 to 16 listed below. The laminate sheet is one obtained by coating both sides of an aluminum film with resin film (polymer). The electrochemical device is constructed by disposing the element main body between two laminate sheets and heat-sealing peripheral regions thereof to enclose the element main body.

Patent Literature 1: Japanese Patent Application Laid-open No. 2009-224147
Patent Literature 2: Japanese Patent Application Laid-open No. 2006-114513
Patent Literature 3: Japanese Patent Application Laid-open No. 2005-116278
Patent Literature 4: Japanese Patent Application Laid-open No. 2004-265762
Patent Literature 5: Japanese Patent Application Laid-open No. 2000-138040
Patent Literature 6: Japanese Patent Application Laid-open No. 2007-311163
Patent Literature 7: Japanese Patent Application Laid-open No. 2006-54099
Patent Literature 8: Japanese Patent Application Laid-open No. 2003-36824
Patent Literature 9: Japanese Patent Application Laid-open No. 2002-75320
Patent Literature 10: Japanese Patent Application Laid-open No. 2006-156161
Patent Literature 11: Japanese Patent Application Laid-open No. 2002-25514
Patent Literature 12: Japanese Patent Application Laid-open No. 2000-156208
Patent Literature 13: International Publication WO2005/036674
Patent Literature 14: Japanese Translation of PCT Application Laid-open No. 2004-515083
Patent Literature 15: Japanese Patent Application Laid-open No. 2009-130073
Patent Literature 16: Japanese Patent Application Laid-open No. 2006-179442

SUMMARY OF THE INVENTION

However, since the thickness of the metal foil (aluminum film) in the laminate sheets is generally only from 10 μm to 100 μm, it has poor mechanical strength and the electrochemical device also has the mechanical strength not high enough against external pressure.

An aspect of the present invention has been accomplished in view of the above-discussed problem and it is therefore an object thereof to provide an electrochemical device capable of improving the mechanical strength.

In order to solve the above problem, an electrochemical device according to an aspect of the present invention is an electrochemical device comprising: an exterior package obtained by bonding peripheral regions of opposed films to each other; and an element main body enclosed in the exterior package, wherein a peripheral region of the exterior package comprises an elastic structure or a plurality of elastic structures having an elastic force in a thickness direction of the films, wherein each of the elastic structures comprises: a first region of the exterior package folded along a film outer edge; and a second region of the exterior package opposed to the first region, and wherein two ends of the first region in a direction along the film outer edge are in contact with the second region, and between the two ends there is a space between the first region and the second region.

In the electrochemical device according to the aspect of the present invention, when a region between the two ends (which will be referred to as a central region) is pushed in the film thickness direction, a force from the central region is transmitted to the contact regions at the two ends and the elastic force of the films produces a reaction in a direction opposite to the pushing direction. Since the elastic structure is formed with the space between the first region and the second region, resistance becomes higher not only to external impact and pressure but also to "twist" around the fold axis and "bend" around an axis perpendicular to the fold axis. In the contact portions, the strength thereof becomes higher because the folded first region is superposed on the second region.

Preferably, a maximum height (2R) of the space from a surface of the exterior package between the two ends, and a maximum height (H) of a central portion of the exterior package from the surface satisfy the following relation: $H/2 \leq 2R \leq 1.2 \times H$.

In this case, the curved shape of the elastic structure is optimized to enhance the elastic force, which provides an effect of more securely protecting the element main body from the external pressure.

Preferably, a contact area (AR) between the first region and the second region at each of the two ends, and a length (h) of the exterior package between the film outer edge and a fold start position of the first region satisfy the following relation: $h/3 \leq (AR)^{1/2} \leq 3 \times h$.

In this case, the shape of the elastic structure is securely maintained to further enhance the elastic force, which provides an effect of more securely protecting the element main body from the external pressure.

The electrochemical device can further comprise a foamed resin filled in the space. In this case, an elastic force of the foamed resin supports the films and thus the foamed resin becomes elastically deformed with application of an external force to generate a reaction, which can enhance the mechanical strength of such part.

Since the electrochemical device according to the aspect of the present invention has the elastic structure obtained by processing the exterior package, it can be improved in mechanical strength.

BRIEF DESCRIPTION OF THE DRAWINGS

FIG. 3 is (A) a vertical sectional view along the line IIIA-IIIA and (B) a vertical sectional view along the line IIIB-IIIB of the peripheral regions of the exterior package shown in FIG. 1.

DESCRIPTION OF THE PREFERRED EMBODIMENTS

The preferred embodiments of the electrochemical devices according to the present invention will be described below with reference to the accompanying drawings. In the description of the drawings, identical or equivalent elements will be denoted by the same reference signs, without redundant description.

Figure 1:
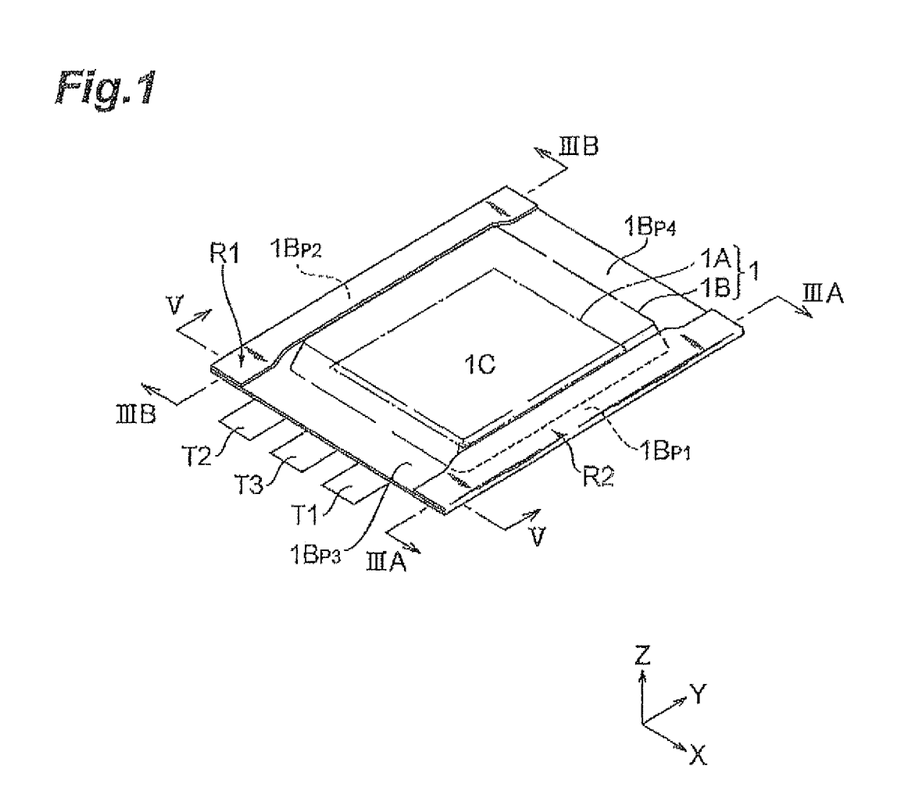
FIG. 1 is a perspective view of an electrochemical device.
Figure 2:
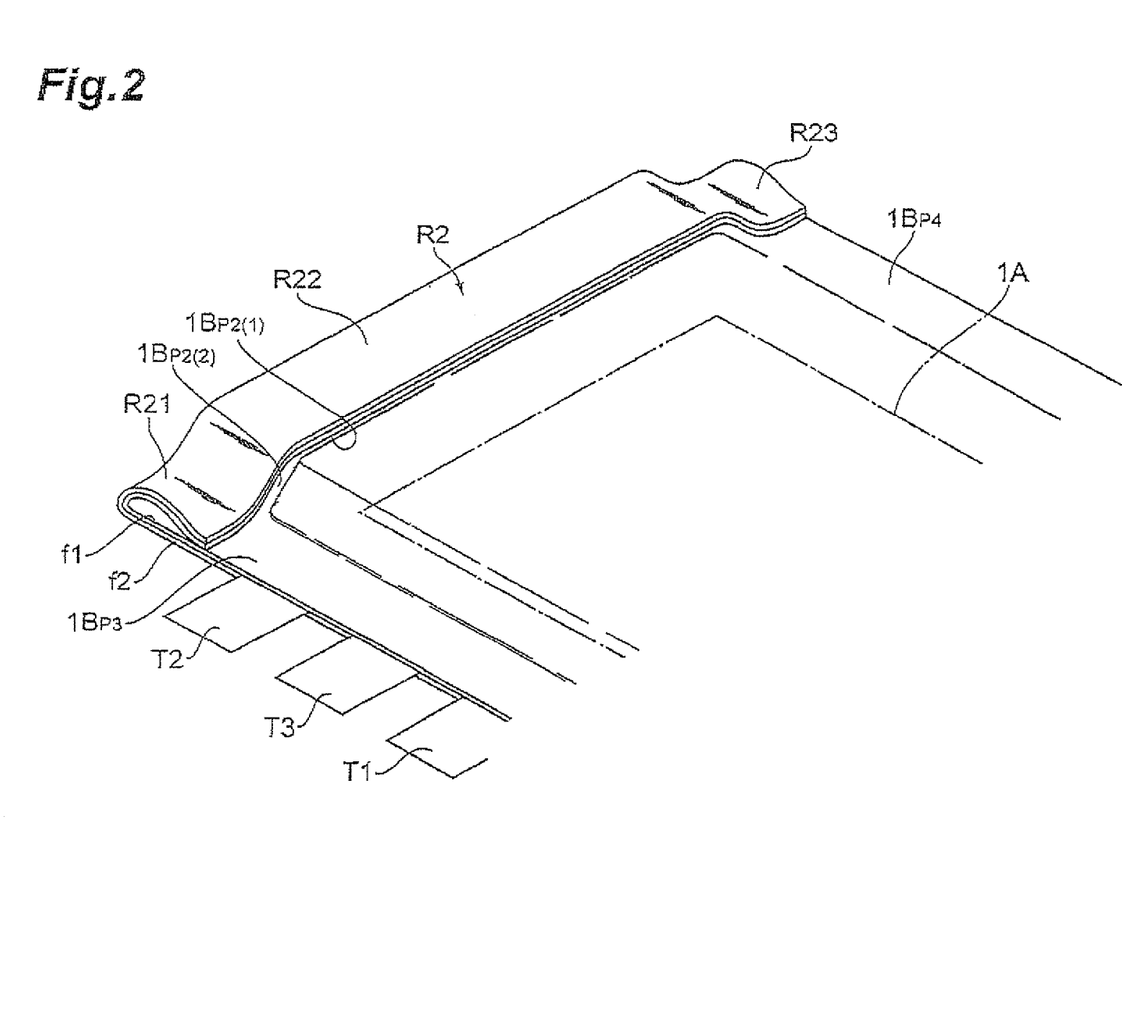
FIG. 2 is an enlarged perspective view of peripheral regions of an exterior package.

FIG. 1 is a perspective view of the electrochemical device according to the first embodiment and FIG. 2 is an enlarged perspective view of peripheral regions of an exterior package.

This electrochemical device 1 is a laminate type electrochemical device having an exterior package 1B covering an element main body 1A. The exterior package 1B has the contour of quadrangular shape and tab type electrodes T1, T2, and T3 of a foil form extend out of one end T constituting one side of the exterior package 1B. The electrochemical device 1 is an electric double layer capacitor (EDLC), but the shape of the exterior package is also applicable to a lithium ion type secondary battery.

Figure 9:
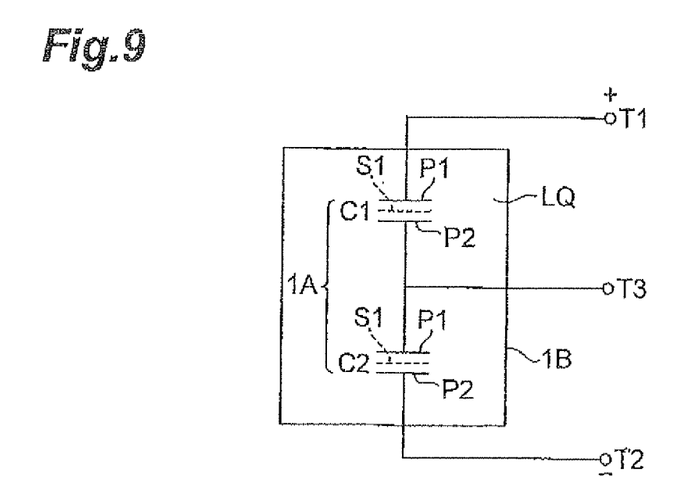
FIG. 9 is a circuit diagram of the electrochemical device.

With reference to the circuit diagram of FIG. 9, the element main body 1A disposed inside the exterior package 1B is provided with capacitors C1, C2 each of which consists of a positive electrode P1, a negative electrode P2, and a separator S1. The separator S1 is comprised of a porous material that allows ions and an electrolyte to pass through, and the interior of the exterior package 1B is filled with an electrolytic solution LQ. The tab type electrode T3 is electrically connected to a node between the capacitors C1 and C2 and a bias potential at this position can be controlled from the outside. The positive electrode P1 of the capacitor C1 is electrically connected to the positive electrode T1, the negative electrode P2 of the capacitor C2 is electrically connected to the negative electrode T2, and these are drawn out from the exterior package 1B. When a power supply is connected to these electrodes T1, T2, charge can be accumulated inside the element main body 1A. Furthermore, charge accumulated inside the element main body 1A can be extracted to the outside through these electrodes T1, T2. In this manner, the electrochemical device has the charge and discharge functions.

As shown in FIG. 2, the exterior package 1B is one obtained by superposing a quadrangular upper film f1 on a quadrangular lower film f2 and bonding their peripheral regions on the four sides. Each of the films f1, f2 forming the exterior package 1B consists of an aluminum laminate film.

An aluminum laminate film is a film wherein aluminum foil is sandwiched in between (or coated by) a pair of resin films. A preferred material of the resin films is a thermoplastic resin, e.g., polypropylene. As described above, the exterior package 1B is one obtained by bonding the peripheral regions of the pair of opposed films f1, f2 to each other.

Referring back to FIG. 1, the exterior package 1B contains the element main body 1A and therefore has a central portion 1C the overall thickness of which is larger than the thickness of the peripheral regions, and the peripheral regions $1B_{P1}$, $1B_{P2}$, $1B_{P3}$, and $1B_{P4}$ surrounding the central region 1C. In an XYZ orthogonal coordinate system, each peripheral region has its longitudinal direction coincident with either the X-axis or the Y-axis and a film thickness direction of the exterior package 1B coincides with the Z-axis direction. The electrodes T1, T2, T3 are arranged between the films f1, f2 in one peripheral region $1B_{P3}$, and the films in these portions are heat-sealed.

A pair of peripheral regions $1B_{P1}$, $1B_{P2}$ having the longitudinal direction along the Y-axis direction, are opposed to each other and are folded each along the film outer edge (Y-axis) to form elastic structures R1, R2. In other words, a fold axis of the films is the Y-axis. The number of peripheral regions each having the elastic structure is preferably two or more in terms of improvement in mechanical strength, but may be one.

As described above, the electrochemical device according to the present embodiment is the electrochemical device with the element main body 1A enclosed in the exterior package 1B, in which the peripheral regions of the exterior package 1B have the elastic structure or elastic structures R1, R2 having an elastic force in the thickness direction (Z-axis direction) of the films.

Figure 3:
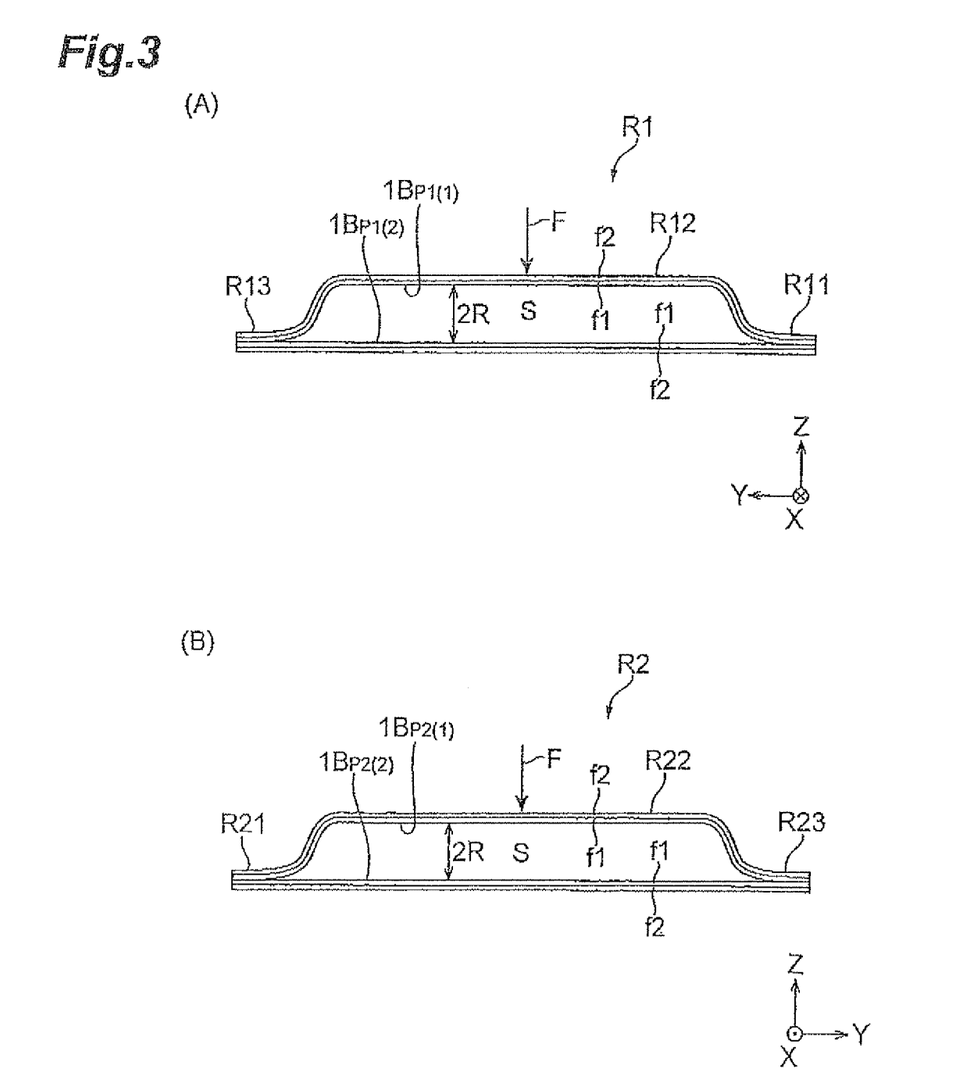

Now, reference is made to FIGS. 2 and 3. FIG. 3 is (A) a vertical sectional view along the line IIIA-IIIA and (B) a vertical sectional view along the line IIIB-IIIB of the peripheral regions of the exterior package shown in FIG. 1.

The elastic structure R1 is provided with a first region $1B_{P1(1)}$ being the peripheral region of the exterior package 1B folded along the film outer edge, and a second region $1B_{P1(2)}$ of the exterior package 1B opposed to the first region $1B_{P1(1)}$. Likewise, the elastic structure R2 is provided with a first region $1B_{P2(1)}$ being the peripheral region of the exterior package 1B folded along the film outer edge, and a second region $1B_{P2(2)}$ of the exterior package 1B opposed to the first region $1B_{P2(1)}$.

Two ends R11, R13 (R21, R23) of the first region $1B_{P1(1)}$ ($1B_{P2(1)}$) in the direction along the film outer edge are in contact with the second region $1B_{P1(2)}$ ($1B_{P2(2)}$), and between the two ends R11, R13 (R21, R23) there is a space (with a maximum height 2R) between the first region $1B_{P1(1)}$ ($1B_{P2(1)}$) and the second region $1B_{P1(2)}$ ($1B_{P2(2)}$).

When a region (central region (or bridge region) denoted by R12 or R22) between the two ends R11, R13 (or R21, R23) is pushed in the film thickness direction (Z-axis direction) (as indicated by an arrow F in FIG. 3), the force from the central region R12 (R22) is transmitted to the contact regions at the two ends R11, R13 (or R21, R23) and the film elastic force (elastic deformation of the films) produces a reaction in the direction opposite to the pushing direction. Since the elastic structures are formed with the space S between the first region and the second region, resistance becomes higher not only to external impact and pressure but also to "twist" around the fold axis (Y-axis) and "bend" around the axis (X-axis) perpendicular to the fold axis. Since in the contact portions at the ends R11, R13, (R21, R23) the folded first region $1B_{P1(1)}$ ($1B_{P2(1)}$) is superposed on the second region $1B_{P1(2)}$ ($1B_{P2(2)}$), the strength thereof is also enhanced.

The front and back surfaces of transition regions between the two ends R11, R13 and the central region R12 of the folded peripheral region constitute curved surfaces inclined relative to the XY plane. The maximum separation distance between the second region $1B_{P1(2)}$ and the first region $1B_{P1(1)}$ opposed to each other is 2R. Likewise, the front and back surfaces of transition regions between the two ends R21, R23 and the central region R22 of the folded peripheral region constitute curved surfaces inclined relative to the XY plane. The maximum separation distance between the second region $1B_{P2(2)}$ and the first region $1B_{P2(1)}$ opposed to each other is 2R.

Figure 4:
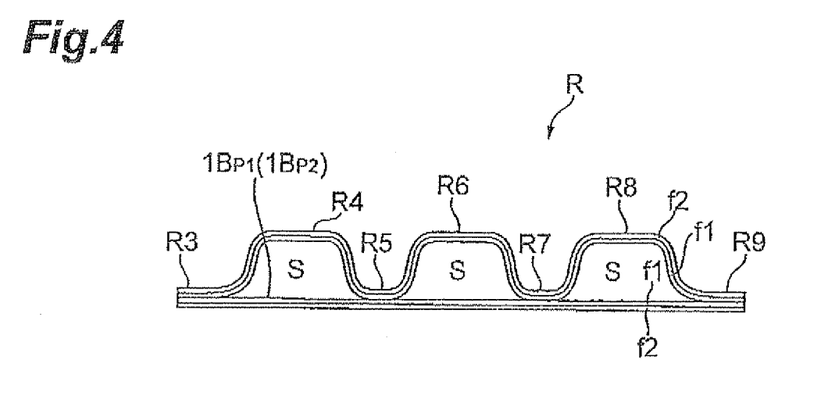
FIG. 4 is a vertical sectional view of the peripheral regions of the exterior package in the electrochemical device according to another embodiment.

FIG. 4 is a vertical sectional view of the peripheral regions of the exterior package in the electrochemical device according to another embodiment.

The present embodiment employs the elastic structures R such that the number of spaces S is not less than 2 per side of the exterior package 1B (three in the present embodiment), instead of the elastic structures R1, R2 shown in FIG. 3. Specifically, a plurality of elastic structures are formed between the two ends R3 and R9 and a plurality of bridge regions R4, R6, R8 are formed between contact positions R3, R5, R7, R9 of the peripheral region serving as bridge piers, so as to undergo elastic deformation with application of a force in the film thickness direction. The other structure in the present embodiment is the same as that shown in FIGS. 1 to 3.

Figure 5:
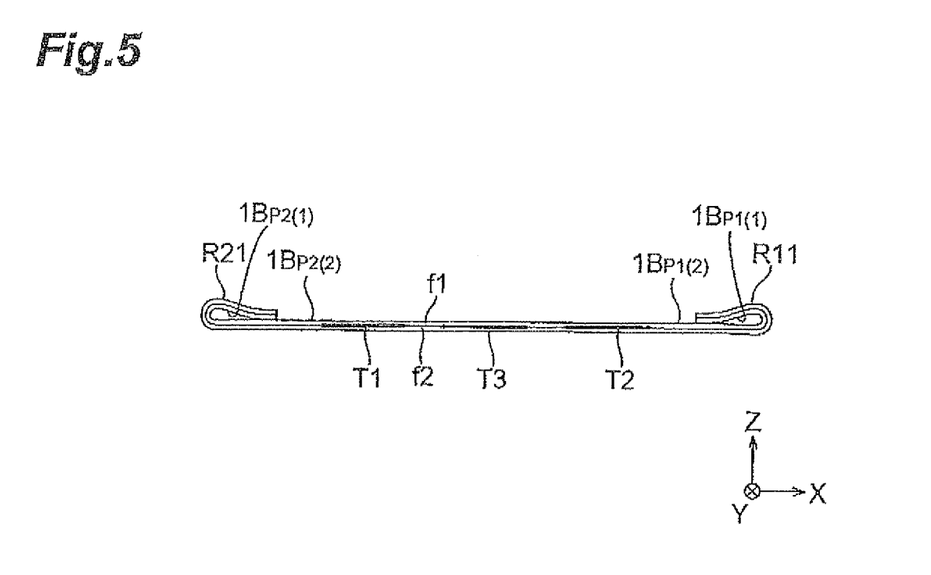
FIG. 5 is a sectional view along the line V-V at an end of a peripheral region of the exterior package.

FIG. 5 is a sectional view along the line V-V at an end of the peripheral region of the exterior package shown in FIG. 1.

The ends R21, R11 of the peripheral regions are folded around the Y-axis in the XZ plane, and near the boundary of the fold the upper first region $1B_{P1(1)}$ and the lower second region $1B_{P1(2)}$ on the right in the drawing are not in contact and are curved with a curvature radius smaller than that of the bridge region. Near the boundary of the fold the upper first region $1B_{P2(1)}$ and the lower second region $1B_{P2(2)}$ on the left in the drawing are not in contact, either, and are curved with a curvature radius smaller than that of the bridge region. This drawing is a view of the object placed in the positive direction of the Y-axis and this structure is the same on a view of the object placed in the negative direction of the Y-axis. Namely, there are the non-contact curved regions at the two ends of the both peripheral regions. This structure decreases a possibility of occurrence of cracking at the two ends of the peripheral regions and thus decreases a probability of liquid leakage from the interior of the exterior package at such portions.

Figure 6:
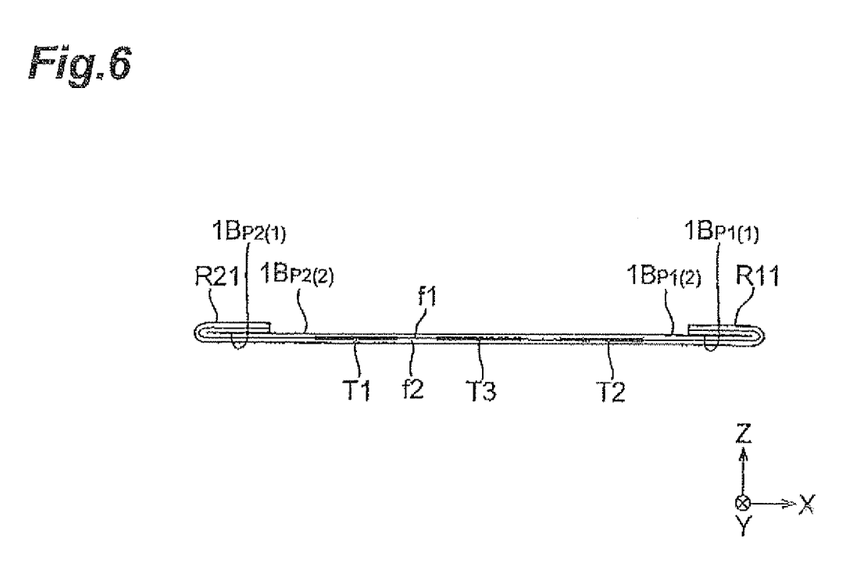
FIG. 6 is a sectional view along the line V-V at an end of a peripheral region of another exterior package.

FIG. 6 is a sectional view along the line V-V at an end of the peripheral region of another exterior package.

The ends R21, R11 of the peripheral regions are folded around the Y-axis in the XZ plane, but near the boundary of the fold the upper first region $1B_{P1(1)}$ and the lower second region $1B_{P1(2)}$ on the right in the drawing are also in contact. Near the boundary of the fold the upper first region $1B_{P2(1)}$ and the lower second region $1B_{P2(2)}$ on the left in the drawing are also in contact. This drawing is a view of the object placed in the positive direction of the Y-axis and this structure is the same on a view of the object placed in the negative direction of the Y-axis. Namely, at the two ends of the both peripheral regions the peripheral regions of the exterior package are pressed so as to leave no space in principle. Specifically, pressure is applied in the film thickness direction to the exterior package at the four corners in order to bring the folded upper regions into contact with the lower regions.

The pressure is applied at the same time as pressure to be applied in the case where it is applied in the film thickness direction of the peripheral region $1B_{P3}$ with the tab electrodes T1, T2, T3 being sandwiched in between the films of the exterior package.

Figure 7:
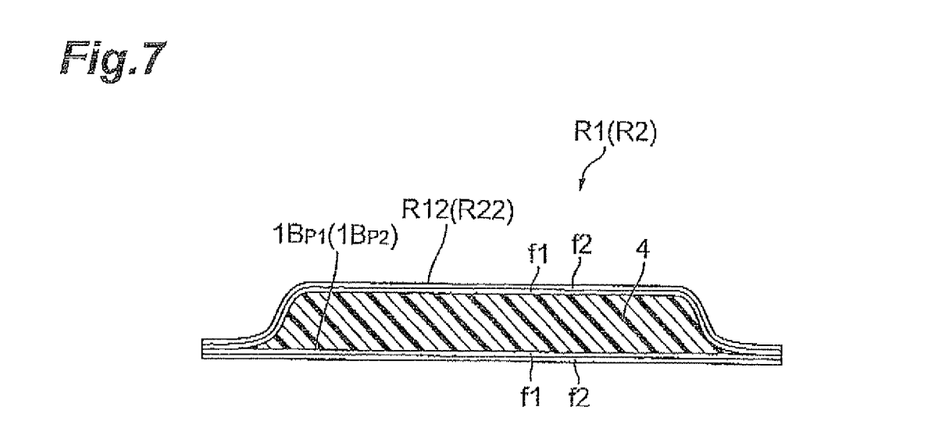
FIG. 7 is a vertical sectional view of a configuration wherein a foamed resin is filled in spaces of the peripheral regions of the exterior package shown in FIG. 3.
Figure 8:
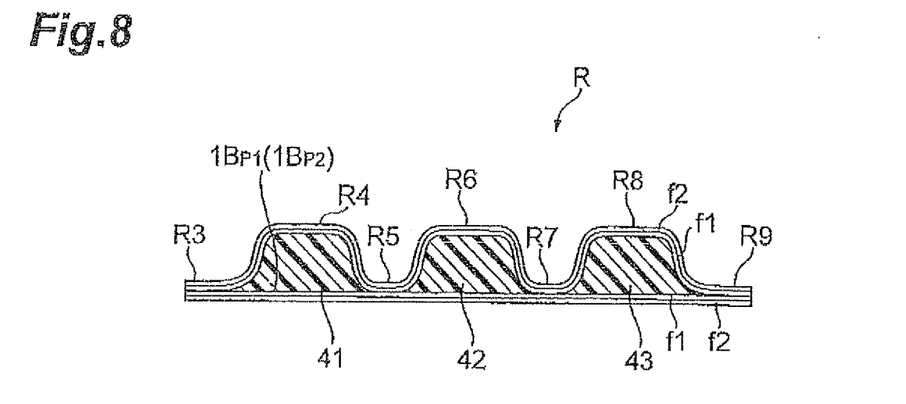
FIG. 8 is a vertical sectional view of a configuration wherein a foamed resin is filled in spaces of the peripheral regions of the exterior package shown in FIG. 4.

FIG. 7 is a vertical sectional view of a configuration wherein a foamed resin is filled in the spaces S of the peripheral regions of the exterior package shown in FIG. 3 and FIG. 8 is a vertical sectional view of a configuration wherein a foamed resin is filled in the spaces S of the peripheral regions of the exterior package shown in FIG. 4. Namely, the electrochemical device further includes the foamed resin 4 (FIG. 7) or foamed resin 41, 42, 43 (FIG. 8) filled in the space S. In this case, the foamed resin 4 (41, 42, 43) supports the films by its elastic force and undergoes elastic deformation with application of an external force to produce a reaction, thereby improving the mechanical strength of such portions.

Examples of the foamed resin includes polyurethane resin, polyethylene resin, polystyrene resin, polypropylene resin, and so on.

Now, let us explain the dimensions of the above-described electrochemical device.

Figure 10:
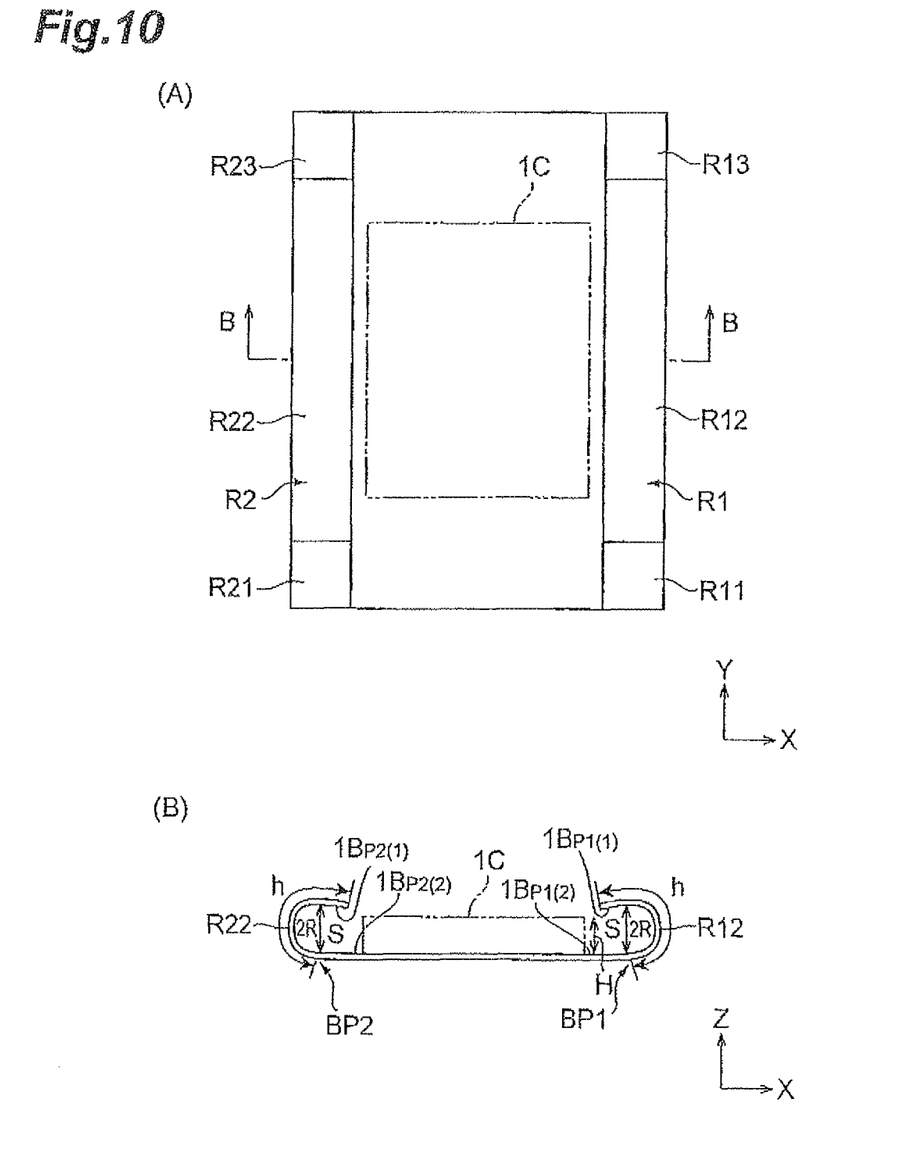
FIG. 10 is a plan view of the electrochemical device and a sectional view thereof along the line B-B.

FIG. 10 is (A) a plane view of the electrochemical device shown in FIG. 1 and (B) a sectional view thereof along the line B-B.

The radius of curvature of the curved portions of this exterior package is R. The maximum height (2R) of the space S from the surface $1B_{P1(2)}$ of the exterior package between the two ends R11, R13 on the right in the drawing, and the maximum height (H) of the central portion 1C of the exterior package 1B from the surface $1B_{P1(2)}$ preferably satisfy the relation of $H/2 \leq 2R \leq 1.2 \times H$. Likewise, the maximum height (2R) of the space S from the surface $1B_{P2(2)}$ of the exterior package between the two ends R21, R23 on the left in the drawing, and the maximum height (H) of the central portion 1C of the exterior package 1B from the surface $1B_{P2(2)}$ preferably satisfy the relation of $H/2 \leq 2R \leq 1.2 \times H$.

In the case of this range, the shape of the curved portions is optimized to enhance the elastic force, which provides an effect of further securely protecting the element main body 1A from external pressure.

Furthermore, the contact area (AR: e.g., the contact area of R11 or R21) between the first region and the second region at each of the two ends, and the length (h) of the exterior package 1B between the film outer edge and the bend start position BP1 (BP2) of the first region preferably satisfy the relation of $h/3 \leq (AR)^{1/2} \leq 3 \times h$.

In the case of this range, the shape of the curved portions is firmly maintained to further enhance the elastic force, which provides an effect of more securely protecting the element main body 1A from external pressure. Since the four corners are flattened as described above, the flattened portions have the increased thickness and become folded at the angle of 180°, so as to enhance the strength. For this reason, the electrochemical device becomes well resistant to an impact at the corners and thus becomes resistant to deformation at the main body part.

As described above, if the peripheral regions (seal portions) of the exterior package remain flat without being folded, the seal portions will be bent even with a small impact and the main body part will undergo deformation; whereas, in the aforementioned embodiments, the mechanical strength is high enough to avoid damage to the seal portions and thereby to reduce influence of water entering a damaged seal part on the characteristics including reliability.

The strengthening of the peripheral regions also leads to suppression of deformation of the main body part, which also reduces a possibility of contact between the electrodes of the capacitors due to breakage of the internal separator, and contact between the tab electrodes, so as to reduce leakage current. Since the electrochemical device of the present embodiment is an EDLC, when the deformation of the internal capacitors is suppressed, a uniform electric field can be produced between the capacitors, so as to ensure stable operation. If the capacitors undergo deformation, the electrolytic solution can be electrolyzed at a local high-voltage part.

Even if the peripheral regions are simply bent, the exterior package will be strengthened against a lateral force but will become deformed with application of a vertical force and have no elastic force against strong impact. In the aforementioned embodiments, the exterior package exhibits a spring effect against the lateral and vertical forces so as to suppress the deformation of the seal portions or the deformation of the main body. Namely, the device is highly resistant to impact and is improved in reliability.

The center bridge regions in the peripheral regions are curved and folded (with the radius of curvature R) in the XZ section and thus exhibit a great spring effect against impacts from the vertical and lateral directions. Since the four corners of the exterior package are flattened, the corners are also resistant to deformation with an impact. Furthermore, the folding as described above decreases the dead space and also contributes to size reduction.

EXAMPLES

A resin film of modified polypropylene (thickness: 30 μm) was compressively bonded through an adhesive to one side of aluminum foil (thickness: 40 μm) and a resin film of nylon (thickness: 30 μm) was compressively bonded through an adhesive to the other side, thereby preparing an aluminum laminate exterior package. This exterior package was folded with the resin film of modified polypropylene inside, and two capacitor main bodies, in each of which aluminum foil sheets with activated carbon thereon and a porous separator were alternately laminated, were superposed inside the exterior package.

Next, a polypropylene sheet 100 μm thick was placed between the opposed films and the two side portions were pressed under the pressure of 1 MPa at the temperature of 180° C. for the time of five seconds to seal the peripheral regions on the two sides. An electrolytic solution was poured into the interior of the exterior package and the upper end (top) part was sealed under the same condition as above, thereby closing the peripheral regions on the four sides. The electrolytic solution used herein was a solution in which tetraethylammonium tetrafluoroborate ($TEA^+BF_4^-$) as an electrolyte was dissolved in propylene carbonate (PC) as an organic solvent, and the dimensions of completed samples were 20 mm×20 mm.

Since the thickness of the element main body consisting of the capacitors was 1.3 mm, a recess 2.7 mm deep was formed in one film of the aluminum laminate exterior package so that the element main body could be housed in the recess. The overall thickness of the cell was 3 mm including the aluminum laminate exterior package and the polypropylene sheet sandwiched in between the films forming it. These are common conditions in experiments below. The seal widths of the peripheral regions all were 3 mm.

Comparative Example 1

In Comparative Example 1, the films were bent at the positions of 2 mm from the outside edges of the films in the side seal width of 3 mm so as to become upright in the vertical direction.

Comparative Example 2

In Comparative Example 2, the curve start positions (BP1, BP2: cf. FIG. 10) were defined at the positions of 2.5 mm from the outside edges of the films in the side seal width of 3 mm, and the peripheral regions were folded so as to become round with the radius of curvature R of 0.8 mm.

EXAMPLE

In Example, the four corners of the exterior package in the sample of Comparative Example 2 were further pressed to flatten under the pressure of 1 MPa for two seconds, as shown in FIG. 1 (FIG. 10). The flattened regions R11, R13, R21, and R23 were set each in the range of 2 mm long×2 mm wide (the area of 4 mm$^2$).

Comparative Example 3

Comparative Example 3 was a sample in which the side seal width of 3 mm was left flat without being folded as it was.

The characteristics of these samples were evaluated by free-fall drop tests. Specifically, Condition (A) was to drop each sample in free fall 100 times from the height of 30 cm with a side surface of the exterior package facing down. Condition (B) was to drop each sample in free fall 100 times from the height of 30 cm with a corner of the exterior package facing down. Each sample was evaluated by states of deformation and measurement of leakage current. The states of deformation were checked by visual inspection or by a caliper (minimum indication: 0.01 mm) and a sample with deformation of not less than 0.5 mm was determined to be a "deformed" sample. The electrical characteristics were evaluated by measurement of leakage current. The voltage of 4.5 V was applied in the CC-CV mode (constant current and constant voltage) of 100 mA and a current value after 24 hours was measured.

Figure 11:
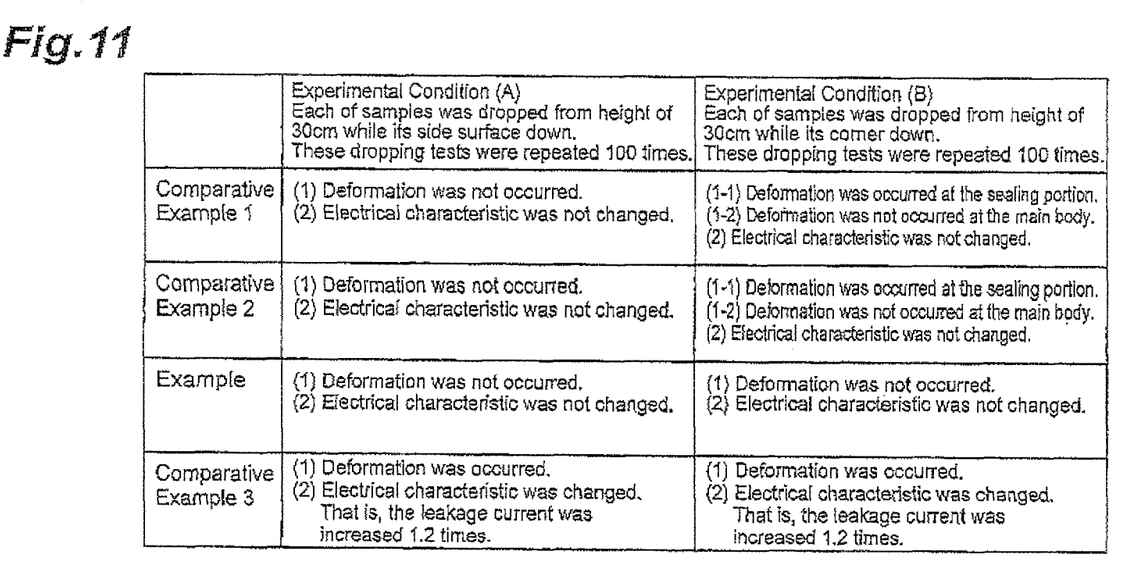
FIG. 11 is a graph showing the experiment results.

The measurement results are shown in the graph of FIG. 11. In the case of Example, neither deformation of the contour nor change in electrical characteristics was observed in each of the conditions, whereas in the cases of Comparative Examples 1 and 2, no characteristic change was observed in Condition (A) but degradation of the characteristic was observed in Condition (B). In the case of Comparative Example 3, degradation of the characteristic was observed in both of Conditions (A) and (B).

When the electrochemical device in Example is employed, as described above, the mechanical strength improves and the resistance to impact improves remarkably.

What is claimed is:

1. An electrochemical device comprising: an exterior package obtained by bonding peripheral regions of opposed films to each other; and an element main body enclosed in the exterior package, the element main body being an electric or electronic device, wherein a peripheral region of the exterior package is bent along an outer edge of the opposed films to form a single fold such that a first section of the peripheral region that is bent overlaps a second section of the peripheral region that is not bent, and that bonded edges of the opposed films are bent to face the element main body, the peripheral region comprising an elastic structure or a plurality of elastic structures having an elastic force in a thickness direction of the films, the films being metallic, being laminated with resin and being opposed to each other in the thickness direction, wherein each of said elastic structures comprises:
a first region that is at least a part of the first section; and
a second region being overlapped by and opposed to the first region, the second region being at least a part of the second section, and
wherein the first region includes two ends in a direction along the outer edge, and a middle section that separates the two ends in the direction along the outer edge, the two ends of the first region being in contact with the second region, and the middle section being separated from the second region in the thickness direction by a space.

2. The electrochemical device according to claim 1, wherein a maximum height (2R) of the space from a surface of the exterior package between the two ends, and a maximum height (H) of a central portion of the exterior package from the surface satisfy the following relation:

$H/2 \le 2R \le 1.2 \times H$.

3. The electrochemical device according to claim 1, wherein a contact area (AR) between the first region and the second region at each of the two ends, and a length (h) of the exterior package between the outer edge and a fold start position of the first region satisfy the following relation:

$h/3 \le (AR)^{1/2} \le 3 \times h$.

4. The electrochemical device according to claim 2, wherein a contact area (AR) between the first region and the second region at each of the two ends, and a length (h) of the exterior package between the outer edge and a fold start position of the first region satisfy the following relation:

$h/3 \le (AR)^{1/2} \le 3 \times h$.

5. The electrochemical device according to claim 1, further comprising a foamed resin filled in the space.

6. The electrochemical device according to claim 2, further comprising a foamed resin filled in the space.

7. The electrochemical device according to claim 3, further comprising a foamed resin filled in the space.

8. The electrochemical device according to claim 4, further comprising a foamed resin filled in the space.

9. The electrochemical device according to claim 1, wherein:
the opposed films include a first film and a second film, the first region including a first part of the first film, the second region including a second part of the first film; and
the first part of the first film included in the first region and the second part of the first film included in the second region contact each other at each of the two ends, and are separated from each other by the space between the two ends.

* * * * *